United States Patent Office 3,555,901
Patented Jan. 19, 1971

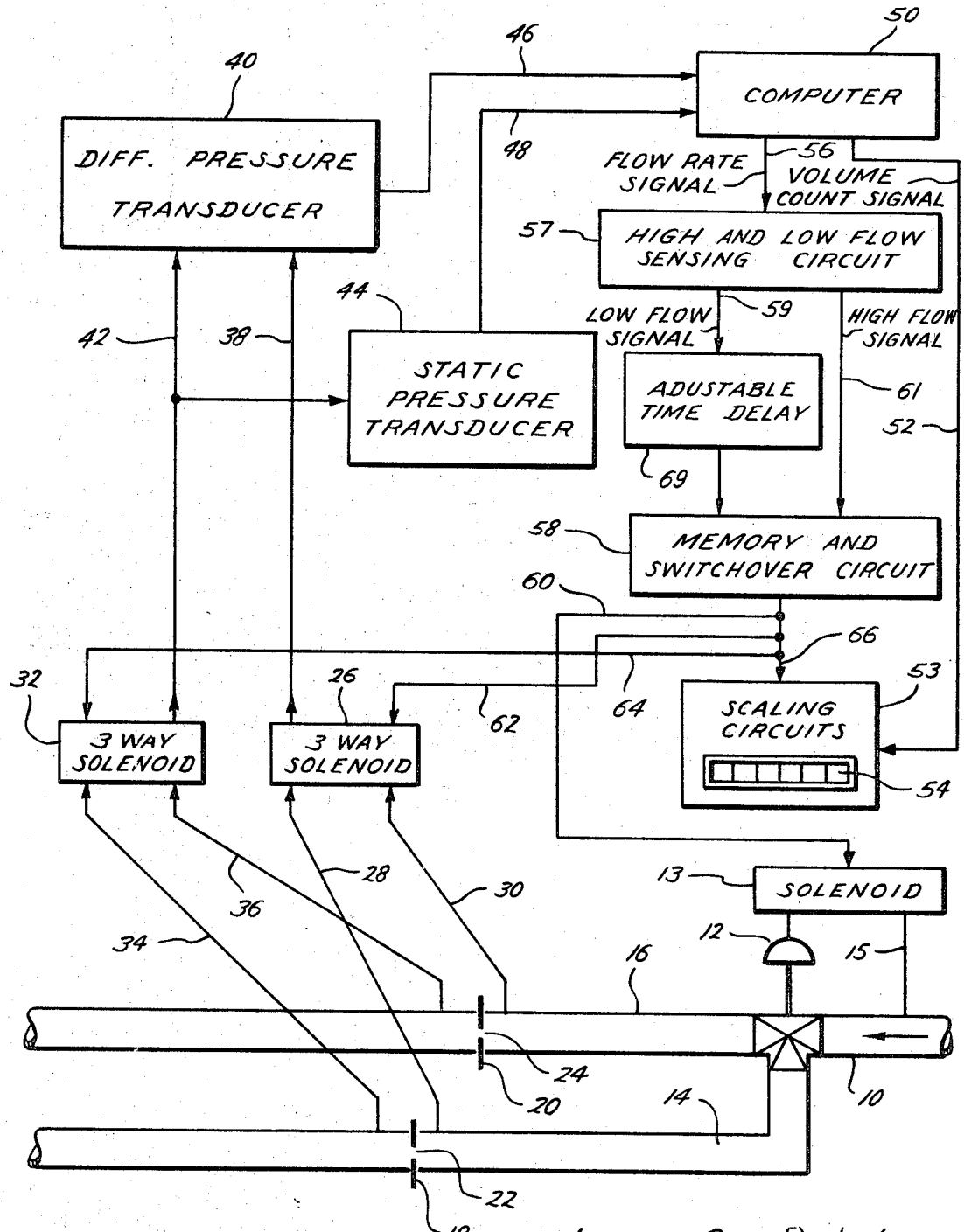

3,555,901
METHOD OF AND APPARATUS FOR MEASURING VARYING FLUID FLOW
Leroy C. Delatorre and Gilbert H. Tausch, Houston, Tex., assignors to Camco, Incorporated, Houston, Tex., a corporation of Texas
Filed Sept. 27, 1968, Ser. No. 763,134
Int. Cl. G01f 1/00; G01p 5/14
U.S. Cl. 73—197
5 Claims

ABSTRACT OF THE DISCLOSURE

A dual meter line having a fluid flow computer and switchover controls in which the measurement system in response to flow rates automatically directs the flow of fluids to be measured through a low or high rate meter line metering orifice where the flow parameters are measured and monitored by the computer which computes the fluid volume. First and second metering lines, connected to a pipeline having different sized measuring orifices therein wherein the fluid flow is directed to one of the metering lines when the flow rate is below a predetermined amount, and a measurement system measures the fluid flow variables in said one line and a flow computer computes the fluid volume, and when the flow rate increases above a predetermined amount the fluid is switched to the second metering line and the flow variables are measured across the second orifice, the flow measurements transmitted to the flow computer in which the counter scale is automatically changed to correlate with the size of the orifice in the second line.

BACKGROUND OF THE INVENTION

The present invention relates to a method of and apparatus for measuring varying fluid flow such as gas through a pipeline. Measurement of fluid flow through an orifice by means of measuring the various parameters such as differential pressure and static pressure and providing a flow computer to compute the volume of flow is generally shown in Patent No. 3,376,745. However, automation of gas measurement often encounters the problem of measuring gas flow which has widely varying flow rates which cannot be accurately measured by a single sized orifice.

SUMMARY OF THE INVENTION

The present invention is directed to providing a method of and an apparatus for measuring varying fluid flows through a pipeline by using dual metering lines connected to the pipeline each having an orifice plate, the orifice in one line being larger than the orifice in the other line in which the measurement system automatically makes a choice of directing the flow through either the low or high rate metering orifice, based upon flow rates monitored by a computer, and in which flow parameters are automatically measured.

A still further object of the present invention is the provision of an apparatus for measuring varying gas flow through a pipeline by providing first and second metering lines connected in the pipeline with a first three-way valve means for directing gas flow in the pipeline through one of the first and second lines, an orifice plate positioned in each of the first and second lines and the orifice in one of said plates being of a different size than the orifice in the other said plate, and provided with second three-way valve means connected to the first and second lines on the upstream side of the orifice plate with a third three-way valve means connected to the first and second lines on the downstream side of the orifice plates, a differential pressure transducer and a static transducer connected to the second and third valve means for measuring the differential pressure and the static pressure in the metering line through which the gas if flowing with a computer receiving the pressure measurements and having a volume measurement output signal and a flow rate output signal, and provided with a flow sensing switchover circuit connected to the flow rate output signal and actuating the first, second and third valves and the computer counter in response to the flow rate to switch the gas flow and transducer measurements between the first and second lines.

A still further object is the provision of time delay means delaying further actuation of the switchover control means upon its actuation in order to allow the valves sufficient time to be fully actuated and the flow to become stabilized.

BRIEF DESCRIPTION OF THE INVENTION

The drawing is a schematic illustrating the present invention.

DESCRIPTION OF THE PREFERRED EMBODIMENT

Referring now to the drawing, fluid such as gas flowing through a pipeline 10 and having a varying flow rate is desired to be measured. A conventional three-way two position diaphragm operated valve 12 is provided to direct the gas flow through either a first low flow rate metering line 14 or a second high flow metering line 16. Valve 12 may be controlled by a solenoid valve 13 which controls the application of gas pressure through a line 15 to the diaphragm of valve 12 for positioning the valve.

Each of the metering lines 14 and 16 includes a conventional orifice plate 18 and 20, respectively, having an orifice 22 and 24 respectively. The orifices 22 and 24 are of different sizes and are preferably sized so that the orifice plate flow coefficients vary by a digital ratio such as 2, 4 or 8 for reasons which will be more fully described hereinafter, with the orifice 24 being, for example, the larger orifice.

Valve means are provided for connecting the measurement system across the orifice plate in the line through which gas is being flowed. Thus, a second valve, such as a threeway solenoid actuated valve 26 is provided connected to pressure lines 28 and 30 which are in turn connected to the metering lines 14 and 16 respectively on the upstream side of the orifice plates 18 and 20. Similarly, a third value such as a three-way solenoid actuated valve 32 is provided connected to pressure lines 34 and 36, which are in turn connected to the metering lines 14 and 16, respectively, on the downstream of the orfice plates 18 and 20. The valves 26 and 32 are connected to the measurement system pressure transducers for selectively measuring the pressure variables across the orifice plate through which gas is being transmitted. Thus, outlet line 38 from valve 26 is connected to a differential pressure transducer 40 and an outlet line 42 from valve 32 is connected to a differential pressure transducer 40 and also to the static pressure transducer 44, as it is conventional in the United States to measure static pressure on the downstream side of the metering line. Of course, if the fluid being measured is a liquid, the static pressure transducer may be omitted. The pressure measurements from transducers 40 and 44 are transmitted through electrical lines 46 and 48 to a conventional flow computer 50, such as shown in Patent No. 3,376,745.

The computer 50 includes a volume count signal output line 52 directed to a conventional scaling network 53 such as one having a series of flip flop circuits and counter 54. The computer 50 also includes a flow rate signal output connected through line 56 to a high and low flow sensing circuit 57. The high-low flow sensing circuit 57 includes an output 59 for conveying a signal when the flow is below a predetermined level and an output 61 when the flow rate is above a predetermined level. Thus when the flow rate through the low volume metering line 14 reaches an adjustable point, such as between 100% and 120% of full scale on the computer 50, a high flow signal is sent out over line 61 to a conventional memory and switchover circuit 58 such as a flip flop and bistable relay circuit which on actuation in turn actuates through line 60 solenoid 13 and thus valve 12, over line 62 to actuate solenoid valve 26, and over line 64 to actuate solenoid valve 32.

Actuation of valve 12 by the solenoid 14 moves the two position valve 12 to shut off the flow from line 10 to metering line 14 and direct the flow to the metering line 16.

Actuation of valves 26 and 32 now disconnects pressure lines 28 and 34 from the transducer lines 38 and 42, and instead connects pressure lines 30 and 36 which transmit the pressure differential across the orifice plate 20 to lines 38 and 42 and to transducers 40 and 44. In addition, the switchover network 58 through a line 66 actuates the scaling network 53 to change the scale on the counter 54 so as to be correlated with the orifice plate flow characteristics of the orifice plate 20 through which the fluid is now flowing. Preferably, the scaling circuit and counter are digital binary types and for ease of scaling, it is preferable that the difference in size between the orifice plates 18 and 20 is such that their flow coefficients vary by a binary ratio such as 2, 4 or 8.

In the event the flow rate through the high volume metering line 16 should diminish to an adjustable point, such as between 10 and 20% on the computer full scale 50, the low flow is detected by the high-low flow sensing circuit 57 and a signal transmitted to line 59 and to the memory and switchover circuit 58 whereby the power to solenoid valves 13, 26 and 32 is deactuated to divert the flow from line 10 to line 14 and provide measurement across the orifice 18 again and a signal is transmitted over line 66 to actuate the scaling network 53 to change the scale on the counter 54 so as to be correlated with the orifice plate flow characteristics of orifice plate 18 through which the fluid is now flowing.

Preferably an adjustable time delay 69 is provided in the low flow signal line 59 which delays measurement for several seconds while the flow is being diverted from low to high flow. While the computer 50 and counter 54 does not record during this time delay, the unmeasured gas volume would be minimal and the time delay is desirable in order to bring the flow rate in the switched high line 16 to normal in order to avoid switching the flow back to the low meter line 14 before full flow was established in line 16.

In use, the gas to be measured from line 10 is normally directed by valve 12 through the low flow rate metering line 14 and orifice plate 18. Solenoid valves 26 and 32 are initially positioned to connect pressure lines 28 and 34 to transducer lines 38 and 42, respectively, for measurement by the transducers 40 and 44 which in turn transmit electrical signals of the measurement through lines 46 and 48 to the computer 50. A flow rate signal is transmitted by line 56 to the high and low sensing circuit 57 and a volume count signal is transmitted on line 52 to the scaling network 53 and counter 54. In the event that the flow rate increases to a predetermined point, the increased flow is detected by sensing circuit 57 a signal through line 61 actuates the memory and switchover network 58 which in turn actuates, through lines 60, 62 and 64, the valves 12, 26 and 32, respectively. In addition, a signal is transmitted over line 66 to the scaling network 53 to change the scale on the counter 54 automatically. The time delay is actuated by circuit 57 to prevent a signal through line 59 until the flow through line 16 becomes normal. Thus gas flow is now being transmitted through high flow rate metering line 16 and is automatically measured. Should, after the time delay, the flow rate through the high volume meter line 16 diminish to a predetermined point, the flow rate signal through line 56 will again be measured by sensing circuit 57 to actuate the switchover network 58 to actuate the solenoid valves 14, 26 and 32 to divert all the flow back to line 14 and change the computer scale automatically.

The present invention, therefore, is well adapted to carry out the objects and attain the ends and advantages mentioned as well as others inherent therein. While a presently preferred embodiment is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. An apparatus for measuring varying fluid flow through a pipeline comprising, first and second metering lines connected in said pipeline, first valve means for directing fluid flow from the pipeline to either one of said first and second lines, an orifice plate having a measuring orifice positioned in each of said first and second lines, the orifice in the first line being larger than the orifice in the second line, second valve means connected to the first and second lines on each side of the said orifice plates for and in one position supplying the differential pressure across one of the orifice plates and in a second position supplying the differential pressure across the other orifice plate, a differential pressure transducer connected to said second valve means for measuring the differential pressure across the orifice plate in the metering line through which flow is directed, a measuring computer connected to the differential pressure transducer for receiving signals of pressure measurement, said computer having a volume measurement output signal and a flow rate output signal, a scaling network having a counter connected to and receiving the volume measurement signal of the computer for counting the volume of flow, a flow sensing circuit connected to the computer flow rate output for sensing predetermined levels of high and low flow rates, a switchover circuit connected to and actuated by the flow sensing circuit, the output from said switchover network connected to and actuating the first and second valves and the scaling network in response to the flow rate to switch the flow and transducer measurements between the first and second lines, and switching the counter scale.

2. The apparatus of claim 1 wherein the orifice sizes differ by a factor divisible by 2.

3. The apparatus of claim 1 including, time delay means connected between the flow sensing circuit and the switchover circuit delaying further actuation of the switchover means upon actuation of the switchover means from low to high flow in order to allow the valves to be fully actuated.

4. An apparatus for measuring varying fluid flow through a pipeline comprising, first and second metering lines connected in said pipeline, first three-way valve means for directing fluid flow in the pipeline through one of said first and second lines, an orifice plate positioned in each of said first and second lines, the orifice in one of said plates being of a different size than the orifice in the other of said plates, and the orifice sizes differ by a binary ratio, second three-way valve means connected to the first and second lines on the upstream side of said orifice plates, third three-way valve means connected to the first and second lines on the downstream side of said orifice plates, a differential pressure transducer connected to said second and third valve means for measuring the differential pressure across one of the orifice plates at a time, a computer connected to the differential pressure transducer for receiving signals of pressure measurement, said computer having a volume measurement output signal and a flow rate output signal, a digital binary scaling network having a counter connected to and receiving the volume measurement signal of the computer for counting the measurement volume of flow, a flow sensing circuit connected to the computer flow rate output for sensing predetermined high and low levels of flow rate, a switchover network connected to and actuated by said sensing circuit on predetermined high and low flow rates, the output from said switchover network connected to and actuating the first, second and third valves, and the scaling network in response to the flow rate to switch the fluid flow and transducer measurements between the first and second lines, and switching the counter scale.

5. The apparatus of claim 4 wherein the first, second and third valves are solenoid actuated.

References Cited
UNITED STATES PATENTS

| | | | |
|---|---|---|---|
| 2,862,387 | 12/1958 | Webster | 73—197X |
| 3,376,745 | 4/1968 | Davis | 73—205 |
| 3,410,138 | 11/1968 | Lynch | 73—197 |

FOREIGN PATENTS

| | | | |
|---|---|---|---|
| 687,344 | 8/1930 | France | 73—197 |

RICHARD C. QUEISSER, Primary Examiner

J. K. LUNSFORD, Assistant Examiner

U.S. Cl. X.R.

73—205, 211